(12) United States Patent
Choules

(10) Patent No.: US 10,302,426 B2
(45) Date of Patent: May 28, 2019

(54) PIPE ALIGNMENT DEVICE

(71) Applicant: Jake Choules, Harrisville, UT (US)

(72) Inventor: Jake Choules, Harrisville, UT (US)

( * ) Notice: Subject to any disclaimer, the term of this patent is extended or adjusted under 35 U.S.C. 154(b) by 99 days.

(21) Appl. No.: 15/454,818

(22) Filed: Mar. 9, 2017

(65) Prior Publication Data

US 2017/0261316 A1 Sep. 14, 2017

Related U.S. Application Data

(60) Provisional application No. 62/306,923, filed on Mar. 11, 2016.

(51) Int. Cl.
  *G01B 11/27* (2006.01)
  *F16L 5/00* (2006.01)
  *H02G 3/22* (2006.01)

(52) U.S. Cl.
  CPC .................. *G01B 11/27* (2013.01); *F16L 5/00* (2013.01); *H02G 3/22* (2013.01)

(58) Field of Classification Search
  CPC ...................................................... G01B 11/27
  USPC ................................................... 33/286, 529
  See application file for complete search history.

(56) References Cited

U.S. PATENT DOCUMENTS

| | | | |
|---|---|---|---|
| 4,947,556 A * | 8/1990 | Peil | G01C 9/24 138/104 |
| 5,568,265 A * | 10/1996 | Matthews | G01B 11/27 33/286 |
| 5,653,036 A * | 8/1997 | Dansereau | A62C 35/68 33/520 |
| 6,124,935 A * | 9/2000 | Matthews | G01C 15/008 33/286 |
| 6,266,143 B1 * | 7/2001 | Peterson | F16L 1/10 33/293 |
| 6,286,219 B1 | 9/2001 | Charles | |
| 6,371,626 B1 | 4/2002 | Addona | |
| 6,532,676 B2 | 3/2003 | Cunningham | |
| 6,643,019 B1 | 11/2003 | Jeanneret | |
| 7,748,127 B1 * | 7/2010 | Cosimano | G01C 15/002 33/286 |
| 7,793,423 B2 | 9/2010 | Loftis et al. | |
| D827,461 S * | 9/2018 | Doeren | G01B 11/27 D10/65 |
| 2001/0034944 A1 * | 11/2001 | Cunningham | G01C 15/008 33/286 |

(Continued)

*Primary Examiner* — George B Bennett
(74) *Attorney, Agent, or Firm* — Global Intellectual Property Agency, LLC; Daniel Boudwin

(57) ABSTRACT

A device for aligning pipes with adjacent structures. The pipe alignment device includes a housing having a first end and a second end, wherein the first end is removably securable to a pipe via threading. The second end of the housing includes a light source that can emit a beam of light along the center of the longitudinal axis thereof. When the housing is secured to a pipe, the light source is activated via a switch disposed on the exterior of the housing. A beam of light contacts an adjacent structure, thereby serving as a marker for drilling a hole in the structure to allow the pipe to align therewith in order to connect or pass through the structure. In one embodiment, the first end of the housing is removable and houses a power source that is operably connected to the switch and the light source for providing power thereto.

6 Claims, 3 Drawing Sheets

(56) References Cited

U.S. PATENT DOCUMENTS

| | | | | |
|---|---|---|---|---|
| 2002/0170190 A1* | 11/2002 | Wetterlind | ............ | G01B 11/26 |
| | | | | 33/286 |
| 2006/0196060 A1* | 9/2006 | Suing | .................. | G01B 11/272 |
| | | | | 33/286 |
| 2012/0297635 A1* | 11/2012 | Mickow | ............... | G01C 15/002 |
| | | | | 33/228 |
| 2016/0041359 A1* | 2/2016 | Gaskin | ................ | G01B 11/272 |
| | | | | 250/573 |

* cited by examiner

PIPE ALIGNMENT DEVICE

CROSS REFERENCE TO RELATED APPLICATION

This application claims the benefit of U.S. Provisional Application No. 62/306,923 filed on Mar. 11, 2016. The above identified patent application is herein incorporated by reference in its entirety to provide continuity of disclosure.

BACKGROUND OF THE INVENTION

The present invention relates to pipe alignment devices. More specifically, the present invention provides a housing having a first end configured to emit a beam of light and a second end that removably secures to an end of a pipe or coupling.

During new and existing building construction, piping installation is required for running electrical wiring, plumbing, and the like. The piping must pass through building structures, such as walls, ceilings, and floors. Even if piping is isolated to single room, piping will likely still need to pass through an electrical cabinet and the like. However, aligning a hole in an electrical cabinet, wall, ceiling, or the like with a pipe is difficult due to the pipe being disposed a distance away therefrom. As a result of improper alignment, the pipe is installed crooked with an offset appearance. Furthermore, the problem of aligned installation is compounded when installing multiple pipes, which can lead to a disastrous appearance and possible intersecting pipes.

In light of the devices disclosed in the known art, it is submitted that the present invention substantially diverges in design elements from the known art and consequently it is clear that there is a need in the art for an improvement to existing pipe alignment devices. In this regard the instant invention substantially fulfills these needs.

SUMMARY OF THE INVENTION

In view of the foregoing disadvantages inherent in the known types of pipe alignment devices now present in the prior art, the present invention provides a new pipe alignment device wherein the same can be utilized for providing convenience for the user when installing pipes.

It is therefore an object of the present invention to provide a new and improved pipe alignment device that has all of the advantages of the prior art and none of the disadvantages. The pipe alignment device includes a housing having a first end and a second end, wherein the first end is removably securable to a pipe via threading. The second end of the housing includes a light source that can emit a beam of light along the center of the longitudinal axis thereof. When the housing is secured to a pipe, the light source is activated via a switch disposed on the exterior of the housing. A beam of light contacts an adjacent structure, thereby serving as a marker for drilling a hole in the structure to allow the pipe to align therewith in order to connect or pass through the structure. In one embodiment, the first end of the housing is removable and houses a power source that is operably connected to the switch and the light source for providing power thereto.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
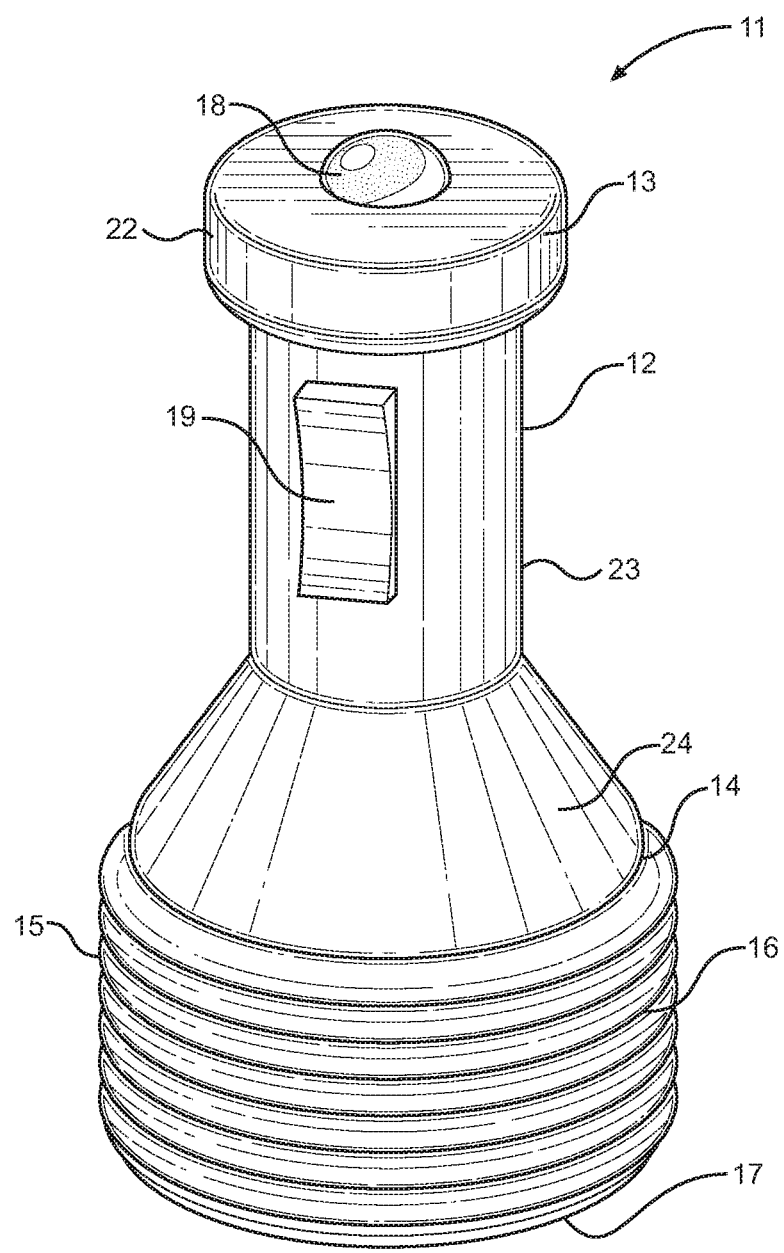
FIG. 1 shows a perspective view of an embodiment of the pipe alignment device.

Reference is made herein to the attached drawings. Like reference numerals are used throughout the drawings to depict like or similar elements of the pipe alignment device. For the purposes of presenting a brief and clear description of the present invention, the preferred embodiment will be discussed as used for installing pipes. The figures are intended for representative purposes only and should not be considered to be limiting in any respect.

Figure 2:
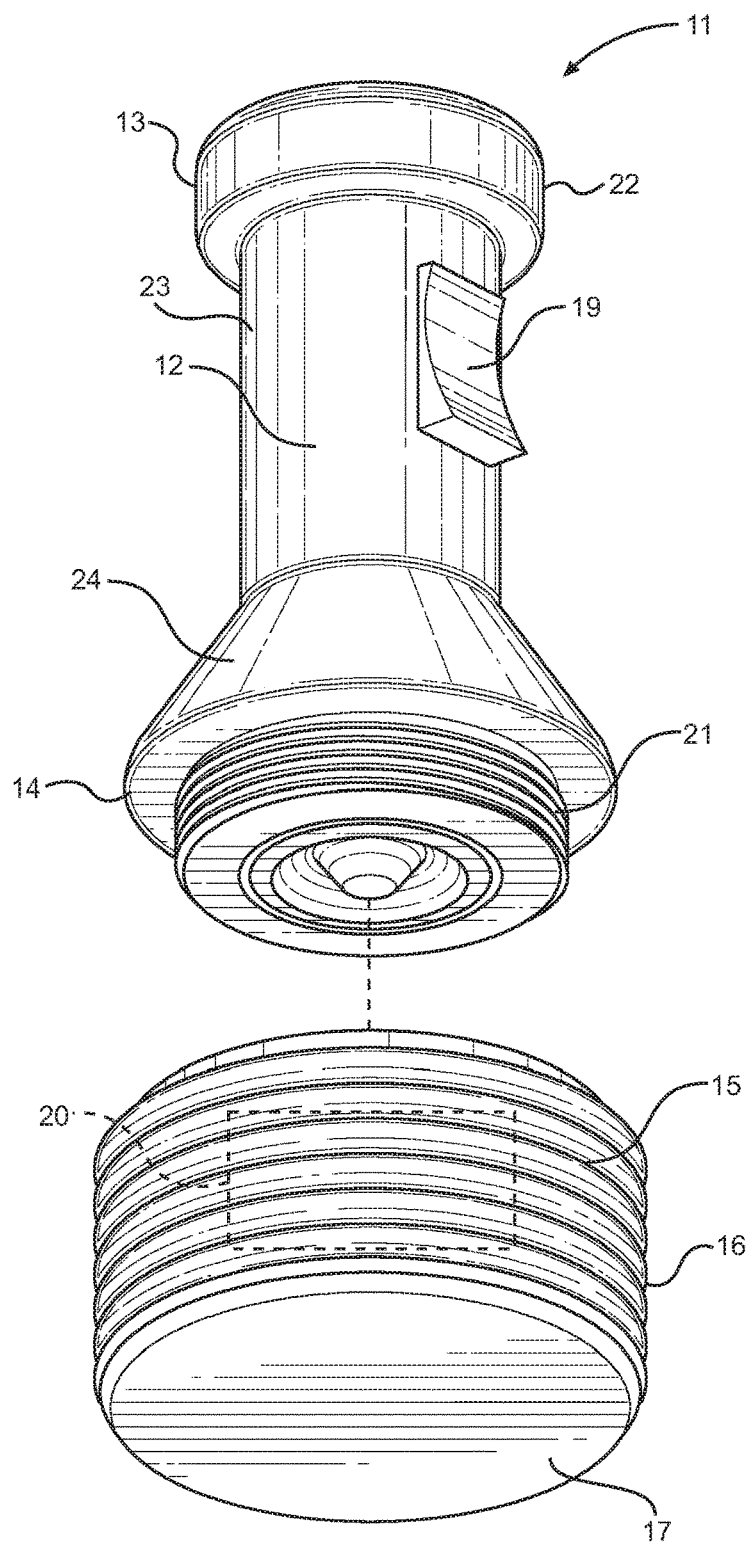
FIG. 2 shows an exploded view of an embodiment of the pipe alignment device.

Referring now to FIGS. 1 and 2, there is shown a perspective view and an exploded view of an embodiment of the pipe alignment device, respectively. The pipe alignment device 11 includes a housing 12 having a first end 15 and a second end 13, wherein the first end 15 is removably securable to a pipe via threading 16. In the illustrated embodiment, the first end 15 comprises a circular cross section so as to allow the first end to fit within a pipe or coupling that secures to a pipe. In the illustrated embodiment, threading 16 is disposed over the entire exterior surface of the first end 15. The threading 16 is configured to engage threading disposed on the interior of a pipe or coupling. In alternate embodiments, the base 17 of the first end 15 comprises an opening for accessing threading disposed on the interior surface thereof. Threading on the interior surface is configured to engage pipes or couplings having threading on the exterior surface thereof. In some embodiments, the first end comprises threading on both the exterior and interior surfaces thereof. In the illustrated embodiment, the base 17 of the first end 15 is planar for allowing the pipe alignment device 11 to rest upright and flush against a horizontal surface.

In the illustrated embodiment, the second end 13 of the housing 12 comprises an upper section 22, a middle section 23, and a lower section 24. The upper section and middle section 23 are cylindrical in shape, wherein the upper section 22 comprises a larger diameter than the middle section 23. The lower section 24 tapers outwards from the middle section 23 towards the base 14. The base 14 of the lower section 24 is configured to rest against the upper edge of the pipe or coupling of which the pipe alignment device 11 is attached. In the illustrated embodiment, the upper section 22 of the second end 13 comprises a smaller diameter than the base 17 of the first end 15 and the base 14 of the lower section 24. The second end 13 of the housing 12 is exposed when the first end 15 is secured to a pipe. The shape of the second end 13 of the housing 12 provides a comfortable gripping area for a user when manipulating the device 11, including screwing and unscrewing the device 11 to a pipe or coupling.

The second end 13 of the housing 12 includes a light source 18 configured to emit a beam of light along the center of the longitudinal axis thereof. In the illustrated embodiment, the light source 18 is a laser diode that emits a beam of light outward from the upper section 22 of the housing 12, perpendicular to the base 17 of the first end 15 of the housing 12. In alternate embodiments, any suitable light source can be used wherein the light source is configured to mark or indicate an end of the beam of light when contacting a surface.

A switch 19 is operably connected to the light source 18 for turning the light source 18 on and off. In the illustrated embodiment, When the switch 19 is disposed on the exterior middle section 23 of the housing 12. A power source 20 is operably connected to the light source 18 for providing power thereto. In one embodiment, the first end 15 of the housing 12 is removable and houses the power source 20 therein. The interior of the first end 15 stores a removable power source 20, such as batteries, so as to allow the power source to be replaced as needed. In the illustrated embodiment, the first end 15 is removably secured to the second end 13 via threading 21.

The threading 21 disposed on the second end 13 is oriented such that rotating the second end 13 relative to the first end 15 in a first direction separates the ends 13, 15 from one another. Rotating the second end 13 relative to the first end 15 in a second direction secures the ends 13, 15 to one another, as well as screws the first end 15 to a pipe. Rotating the ends 13, 15 in the first direction removes the first end from the pipe as well as separates the ends 13, 15 from one another. However, some embodiments include a removable latch positioned between the ends 13, 15 that prevents the ends 13, 15 from being separated from one another when the pipe alignment device 11 is being unscrewed from the pipe.

Figure 3:
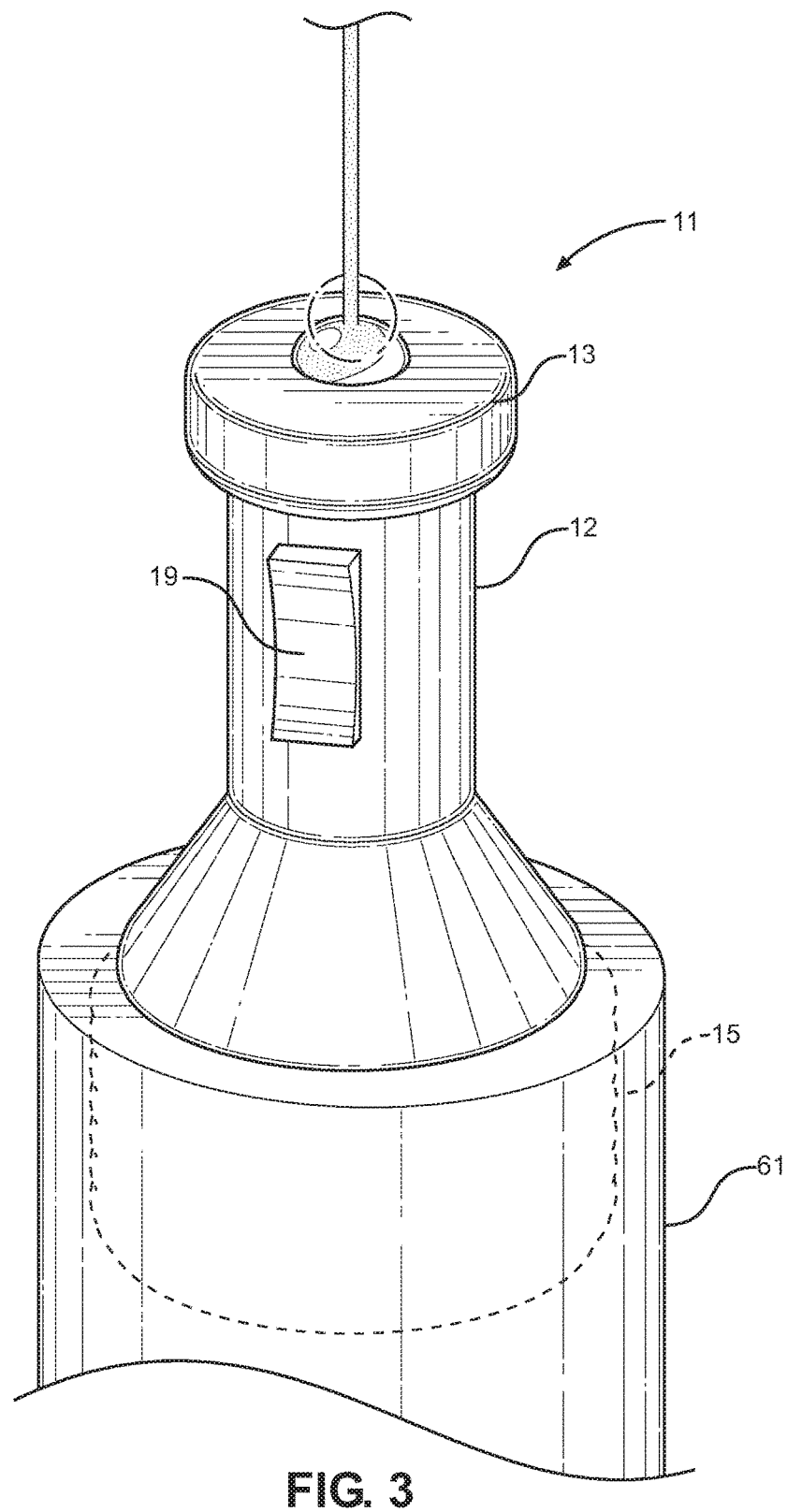
FIG. 3 shows a perspective view of an embodiment of the pipe alignment device in use.

Referring now to FIG. 3, there is shown a perspective view of an embodiment of the pipe alignment device in use. In use, the first end 15 of the housing 12 is secured to an end of a pipe 61 or coupling via mating threading. The end of the pipe 61 faces an adjacent structure that is required to receive the pipe 61 therethrough. The switch 19 is turned on and a beam of light is emitted from the second end 13 of the housing 12. The end of the beam of light contacts the adjacent structure, thereby serving as a marker for drilling a hole in the structure to allow the pipe to align therewith in order to connect or pass through the structure.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pipe alignment device, comprising:
   a housing including a first end and a second end;
   a light source disposed within the housing, the light source configured to emit light from the second end and along a longitudinal axis of the housing;
   threading disposed on exterior of the first end of the housing;
   a switch disposed on the exterior of the housing, wherein the switch is operably connected to a power source and the light source.

2. The pipe alignment device of claim 1, wherein the first end of the housing comprises a circular cross section.

3. The pipe alignment device of claim 1, wherein a base of the first end is planar.

4. The pipe alignment device of claim 1, wherein the first end is removably secured to the second end of the housing.

5. The pipe alignment device of claim 1, wherein the second end comprises an upper section, a middle section, and a lower section;
   the upper section comprising a larger diameter than the middle section;
   the lower section tapers outwards from the middle section.

6. The pipe alignment device of claim 1, wherein the second end of the housing is configured to remain exterior to a pipe when the first end is secured to the pipe.

* * * * *